June 24, 1941.    I. A. DALE    2,247,222

FINANCIAL INSTRUMENT

Filed March 21, 1940

Patented June 24, 1941

2,247,222

UNITED STATES PATENT OFFICE 2,247,222

FINANCIAL INSTRUMENT

Irl A. Dale, Memphis, Tenn.

Application March 21, 1940, Serial No. 325,260

3 Claims. (Cl. 283—12)

My invention relates to improvements in financial instruments and has as one of the principal objects thereof the provision of a financial instrument so constructed and arranged whereby a check may be severed from a stub in a manner to provide the check with a coupon section indicating the highest amount for which the check may be negotiated.

Another object of my invention is to provide a financial instrument of the above described character which is simple in construction, efficient in use, and economical in manufacture.

Other objects and advantages will be apparent from the following description, appended claims and annexed drawing.

Referring to the drawing wherein like reference characters designate like parts throughout the several views:

Figure 1 illustrates the obverse face of a financial instrument constructed in accordance with my invention.

Figure 2 illustrates the reverse face of said instrument.

Figure 3 is a view illustrating the obverse face of a check when properly filled in and detached from the stub.

Figure 4 is a sectional view taken on the line 4—4 of Figure 3.

In practicing my invention, as illustrated in the several views of the drawing, I provide a financial instrument 5 comprising check or draft, stub and interjacent sections 6, 7 and 8 respectively and with said interjacent section connecting said check and stub sections together. The section 8 is of a substantially L-shaped configuration and comprises vertical and horizontal portions 9 and 10 respectively. The obverse face of the portion 10 is provided with transparent adhesive material 11 for a purpose hereinafter set forth.

The vertical portion 9 of the section 8 is formed with a quaternary of spaced vertical perforated lines 12, 13, 14 and 15 dividing said portion into a quaternary of vertically disposed coupons 16. The obverse face of said coupons 16 is provided with indicia indicative of monetary values in dollars, for instance $1.00, $2.00, $3.00 and $4.00 respectively. The lines 12 extend downwardly from the upper marginal edge of the instrument and terminate in step formation, with respect to each other, an appreciable distance superjacent the lower marginal edge and in right angular relation with spaced horizontally disposed perforated lines 17 defining the lower ends of the coupons 16.

The horizontal portion of the section 8 is formed with spaced horizontal upper and lower perforated lines 18 and 19 respectively and with vertical perforated lines 20, 21, 22, 23, 24, 25, 26, 27, 28, 29 and 30 which coact with the lines 18 and 19 and the lower marginal edge of the instrument to define upper and lower horizontally extending rows of ten subelongated vertically disposed coupons 31 and 32 respectively. The coupons 31 of the upper row are provided on their respective obverse and reverse faces with indicia denoting monetary values in relatively large amounts of cents, for instance 10¢, 20¢, 30¢, 40¢, 50¢, 60¢, 70¢, 80¢, 90¢ and 91¢ respectively, while the coupons 32 of the lower row are similarly provided with indicia denoting monetary values in small amounts of cents, for instance 1¢, 2¢, 3¢, 4¢, 5¢, 6¢, 7¢, 8¢ and 9¢ respectively, as clearly illustrated in Figure 1 of the drawing.

Subjacent the lower ends of the lines 12 and in alignment therewith, the instrument has printed thereon lines of indicia 33 denoting fold lines for a purpose hereinafter set forth. The check section 6 is provided with an area or line 34 whereby a desired monetary amount may be written thereon, for instance $3.65 as depicted in Figure 3 of the drawing. When the instruments are assembled in book form or stacked one upon the other, sheets coated with paraffin or the like are interposed between the instruments to preclude the obverse faces of the respective portions 10 from adhering to the respective adjacent instruments. However, if desired the reverse faces of the portions 10 may be covered with wax or paraffin to maintain said faces separated from the obverse faces of the adjacent portions 10.

In use, assuming the check or draft section 6 is filled in on the area or line 34 for the amount of $3.65, the check section 6 is severed from the stub section 7 on the perforated line 14 to the sinistral adjacent line 17, on said line 17 to the lower end of a line 15 subjacent the line 18, sinistrally on the line 18 to the line 24, on said line 24 to the line 19, dextrally on said line 19 to the line 25, and on the line 25 from the line 19 to the lower marginal edge of the section 8, as indicated by the dot and dash line a—a in Figure 1 of the drawing.

When the check section has been completely severed from the stub section, that part of the portion 10 remaining connected to said check section is folded lengthwise over the observe face of the check, on the fold line subjacent the lower end of the line 14, and affixed to said check section by the adhesive material 11 thereby disposing the reverse side of said aforementioned part of the portion 10 to view whereby the highest amounts on the coupons 16, 18 and 19 will read $3.00, 60¢ and 5¢ respectively and which amounts added together coincide with the amount filled in on the line 34.

From the foregoing it will be apparent that I have provided a simple and efficient form of a financial instrument so constructed whereby when the check section is properly severed from the stub section, the coupon or coupons retained on said check section will clearly indicate the amount of the check section and thus preclude the filled in value from being raised.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in various forms, and that the invention comprehends all construction within the scope of the appended claims.

What I claim is:

1. In a check or like financial instrument, a sheet having a body portion and a stub portion at one end of the body portion, a plurality of transversely arranged value denoting sections intermediate the body and stub portions, the said sections extending from the top edge of the sheet to points short of the bottom edge thereof and being separated by perforated lines for selective separation thereof, a plurality of value denoting sections extending longitudinally along the lower part of the stub portion bounded by perforated lines, the said bottom sections having adhesive applied to their front faces so that said sections may be folded over onto the body of the check to adhere to the said body.

2. In a check or like financial instrument, a sheet having a relatively large body portion and a smaller stub portion at one end of the body, a plurality of elongated transversely arranged value denoting sections extending from the top edge of the sheet to varying points short of the bottom edge thereof and separated by perforated lines for selective separation from the sheet with the stub portion, and a plurality of rows of value denoting sections extending longitudinally from the bottom portion of the transverse sections below the stub portion and bounded by perforated lines, said bottom sections having adhesive applied to the front faces and being adapted to be folded over onto the front face of the body portion of the sheet when the stub portion and proper transverse and longitudinally extending sections have been separated from the sheet so as to assume complementary relation with the remaining transverse sections for denoting approximately the amount for which the instrument is drawn.

3. In a check or like financial instrument, an elongated sheet having a relatively large body portion and a smaller stub portion at one end thereof, a plurality of elongated transversely arranged sections extending from the top edge of the sheet to varying points short of the bottom edge of the sheet intermediate the stub and body portions, the said transverse sections being separated by perforated lines for selective separation with the stub portion and bearing value denoting characters in terms of dollars, and a plurality of longitudinally extending rows of sections extending from the bottom part of the transverse sections below the stub portion bounded by perforated lines and bearing value denoting characters in terms of tens and units respectively, the said longitudinal rows of sections having adhesive applied to the front faces thereof for folding over onto the body portion of the sheet when the stub and proper transverse and bottom sections have been separated from the remainder of the sheet so that the bottom sections will adhere to the front face of the body in complementary relation with the remaining transverse sections to denote approximately the amount for which the instrument is drawn.

IRL A. DALE.